United States Patent
Kilchyk et al.

(10) Patent No.: US 12,377,715 B2
(45) Date of Patent: Aug. 5, 2025

(54) HYBRID ENVIRONMENTAL CONTROL SYSTEM FOR SPLIT COOLING

(71) Applicant: Hamilton Sundstrand Corporation, Charlotte, NC (US)

(72) Inventors: Viktor Kilchyk, Lancaster, NY (US); Aiden Coutin, Ogden, UT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/305,820

(22) Filed: Apr. 24, 2023

(65) Prior Publication Data

US 2024/0351400 A1    Oct. 24, 2024

(51) Int. Cl.
*B60H 1/32*    (2006.01)
*B60H 1/00*    (2006.01)

(52) U.S. Cl.
CPC ....... *B60H 1/3228* (2019.05); *B60H 1/00064* (2013.01)

(58) Field of Classification Search
CPC .. B60H 1/3228; B60H 1/00064; B64D 13/06; B64D 2013/0688; B64D 13/08; B64D 13/02; B64D 2013/0603
See application file for complete search history.

(56) References Cited

U.S. PATENT DOCUMENTS

| | | | |
|---|---|---|---|
| 4,963,174 A | 10/1990 | Payne | |
| 4,966,005 A | 10/1990 | Cowell et al. | |
| 6,457,318 B1 | 10/2002 | Lui et al. | |
| 6,526,775 B1 * | 3/2003 | Asfia | B64D 13/06 62/401 |
| 7,024,874 B2 * | 4/2006 | Zywiak | F25B 6/02 62/506 |
| 8,915,095 B2 | 12/2014 | Bruno et al. | |
| 10,207,809 B2 | 2/2019 | Koerner et al. | |
| 10,501,191 B1 | 12/2019 | Dooley et al. | |
| 2018/0148183 A1 * | 5/2018 | Golle | B64D 13/06 |
| 2022/0177141 A1 | 6/2022 | Shea et al. | |

OTHER PUBLICATIONS

Search Report issued in European Patent Application No. 24171408. 8; Date of Mailing Dec. 18, 2024 (12 pages).
EP Partial Search Report; Application No. 24171408.8; Date of mailing: Sep. 27, 2024; 13 pages.

* cited by examiner

*Primary Examiner* — Frantz F Jules
*Assistant Examiner* — Martha Tadesse
(74) *Attorney, Agent, or Firm* — CANTOR COLBURN LLP

(57) ABSTRACT

A vehicle includes a first area conditioned by a first medium, a second area conditioned by a second medium, and an air management system. The air management system includes a source of third medium, an environmental control system fluidly coupled to the source of third medium and to the second area, and a closed loop vapor compression system having a refrigeration medium circulating therein. The vapor compression system is fluidly coupled to the first area, the second area, and the source of third medium. During normal operation, both a first flow of the third medium conditioned within the environmental control system and a second flow of the third medium are provided to the second area.

20 Claims, 5 Drawing Sheets

HYBRID ENVIRONMENTAL CONTROL SYSTEM FOR SPLIT COOLING

BACKGROUND

Exemplary embodiments pertain to one or more subsystems of an aircraft, and more particularly, to a vapor compression system thermally coupled to an environmental control system.

A typical commercial aircraft includes several nonintegrated cooling systems configured to provide temperature control to various regions of the aircraft. For example, an aircraft environmental control system primarily provides heating and cooling for the aircraft cabin area. In addition, a galley chiller system is dedicated to refrigerating the food carts in the galleys located throughout the aircraft. Yet another system is dedicated to cooling the cargo area of the aircraft. Since each system has a significant weight and power requirement, the overall efficiency of the aircraft is affected by these nonintegrated systems.

BRIEF DESCRIPTION

According to an embodiment, a vehicle includes a first area conditioned by a first medium, a second area conditioned by a second medium, and an air management system. The air management system includes a source of third medium, an environmental control system fluidly coupled to the source of third medium and to the second area, and a closed loop vapor compression system having a refrigeration medium circulating therein. The vapor compression system is fluidly coupled to the first area, the second area, and the source of third medium. During normal operation, both a first flow of the third medium conditioned within the environmental control system and a second flow of the third medium are provided to the second area.

In addition to one or more of the features described above, or as an alternative, in further embodiments the second flow of the third medium is conditioned within the vapor compression system.

In addition to one or more of the features described above, or as an alternative, in further embodiments the second flow of the third medium is mixed with a flow of cabin recirculation air at a location upstream from the second area.

In addition to one or more of the features described above, or as an alternative, in further embodiments the second flow of the third medium is mixed with the flow of cabin recirculation air at a location upstream from the vapor compression system.

In addition to one or more of the features described above, or as an alternative, in further embodiments the vapor compression system includes a heat exchanger and the mixed second flow of the third medium and flow of cabin recirculation air is conditioned within the heat exchanger.

In addition to one or more of the features described above, or as an alternative, in further embodiments the second flow of the third medium is mixed with a flow of cabin recirculation air at a location downstream from the vapor compression system.

In addition to one or more of the features described above, or as an alternative, in further embodiments a temperature of the second flow of the third medium mixed with the flow of cabin recirculation air is selected to meet a temperature demand of the second area.

In addition to one or more of the features described above, or as an alternative, in further embodiments a pressurization of the first flow of the third medium is selected to meet a pressurization demand of the second area.

In addition to one or more of the features described above, or as an alternative, in further embodiments including a mixer located upstream from the environmental control system and the vapor compression system. A flow of third medium output from the mixer is provided to an inlet of the environmental control system as the first flow of third medium and another flow of third medium output from the mixer is provided to vapor compression cycle as the second flow of third medium.

In addition to one or more of the features described above, or as an alternative, in further embodiments including a heat exchanger arranged upstream from an inlet the mixer.

In addition to one or more of the features described above, or as an alternative, in further embodiments including a compressor arranged upstream from an inlet of the mixer.

In addition to one or more of the features described above, or as an alternative, in further embodiments the second area is a cabin.

In addition to one or more of the features described above, or as an alternative, in further embodiments the first area is a cargo area.

In addition to one or more of the features described above, or as an alternative, in further embodiments the vapor compression system includes a heat exchanger fluidly coupled to an outlet of the first area. The first medium at an outlet of the first area is conditioned within the heat exchanger.

In addition to one or more of the features described above, or as an alternative, in further embodiments the heat exchanger has a first portion and a second portion fluidly separate from the first portion. An inlet of the first portion is fluidly coupled to the second area an inlet of the second portion is fluidly coupled to the first area.

According to an embodiment, an air management system includes an area to be conditioned by at least one of a first medium and a second medium, a first system fluidly coupled to the area to be conditioned and a second system fluidly coupled to the area to be conditioned. The first medium is provided to the area to be conditioned from the first system and the second medium is provided to the area to be conditioned from the second system. A pressurization of the first medium is selected to meet a pressurization demand of the area and a temperature of the second medium is selected to meet a temperature demand of the area to be conditioned.

In addition to one or more of the features described above, or as an alternative, in further embodiments the second system, includes a heat exchanger and the second medium is conditioned within the heat exchanger.

In addition to one or more of the features described above, or as an alternative, in further embodiments the second system is a closed loop vapor compression system.

In addition to one or more of the features described above, or as an alternative, in further embodiments the first system is an environmental control system.

In addition to one or more of the features described above, or as an alternative, in further embodiments the second medium is cabin recirculation air.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
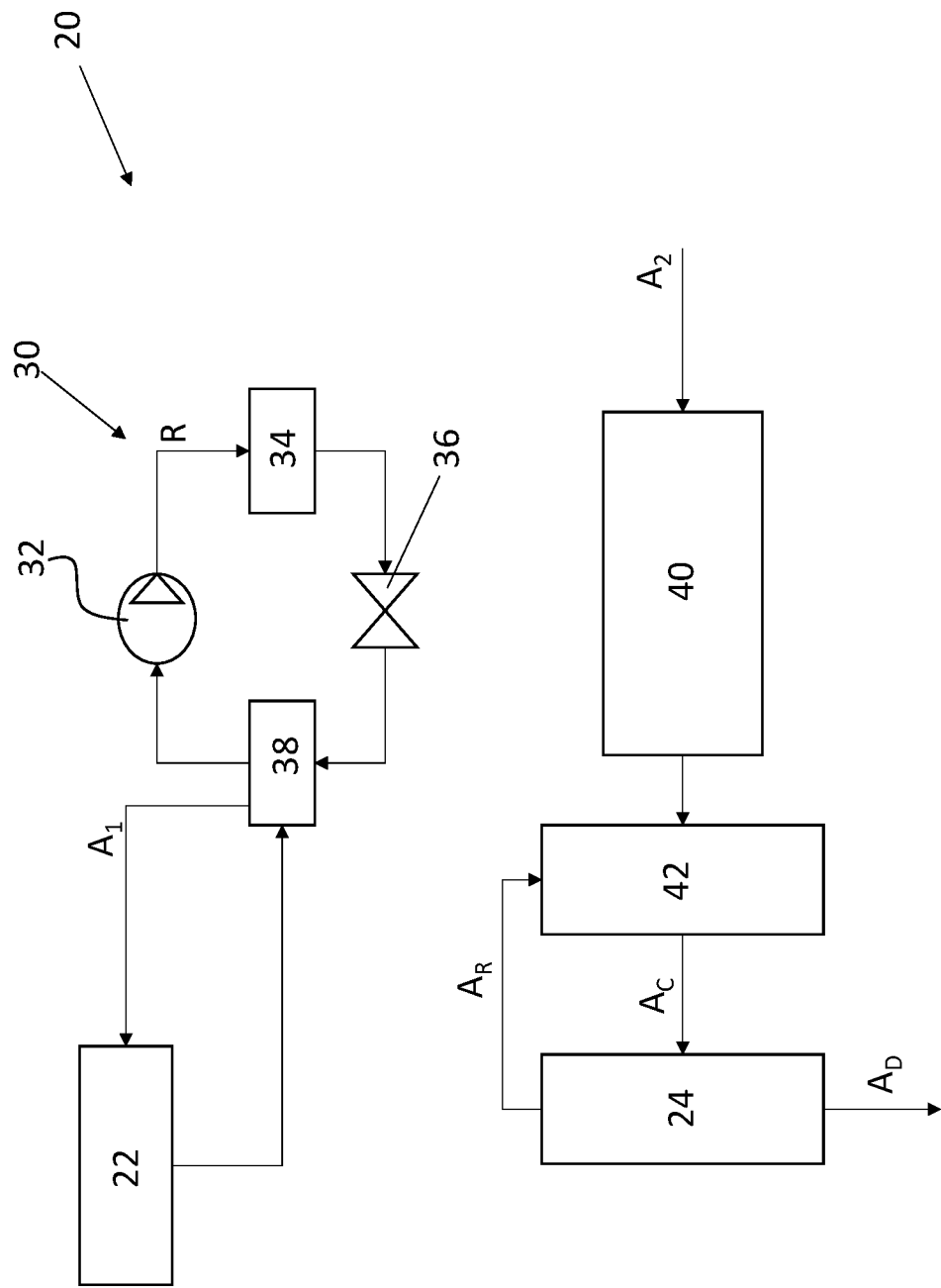
FIG. 1 is an example of a schematic diagram of an existing air management system of an aircraft.

Referring to FIG. 1, an example of an existing air management system 20 for providing conditioned air to a plurality of areas of a vehicle is illustrated. In the illustrated, non-limiting embodiment, the vehicle is an aircraft and the plurality of areas includes a first area 22, such as a cargo compartment for example, and a second area 24, such as a cabin including at least one of a passenger area and a cockpit for example. However, it should be understood that any suitable areas of a vehicle that require conditioning are contemplated herein.

In the existing air management system, a first system, such as a vapor compression system 30 for example, is operable to condition a flow of medium, such as a first medium $A_1$ provided to the first area 22. As shown, the vapor compression system 30 is a closed loop vapor compression system through which a refrigeration medium R, such as a refrigerant, water, or another fluid is configured to circulate. At its most basic level, the vapor compression system 30 may include a compressor 32, a first heat exchanger 34, an expansion valve 36, and a second heat exchanger 38 arranged in series relative to the flow of the refrigeration medium R. Although not shown, in an embodiment, the vapor compression system 30 may be configured as heat pump such as via inclusion of a reversing valve. In such embodiments, each of the first heat exchanger and the second heat exchanger is selectively operable as a condenser or heat rejecting heat exchanger and an evaporator or heat absorbing heat exchanger. The cargo compartment 22 is fluidly coupled to a heat exchanger, such as the second heat exchanger 38 for example, of the vapor compression system 30.

A separate second system of the air management system 20, such as an environmental control system 40 for example, is operable to condition a flow of a second medium $A_2$ to the second area 24. An environmental control system 40 typically includes an air cycle machine having a compressor and a turbine coupled by a shaft. The environmental control system 40 is operable to provide a sufficient air supply for cooling and pressurization of the cabin 24. The environmental control system 40 may have any suitable configuration capable of conditioning the second medium $A_2$ or a mixed medium (a combination of two or more mediums including the second medium $A_2$). As shown, the conditioned medium output from the environmental control system 40 is provided to an air mixing unit 42, where the conditioned medium may be mixed with another flow, such as a flow of cabin recirculation air $A_R$ for example. From the air mixing unit 42, a flow of medium, such as a mixture of the conditioned medium output from the environmental control system 40 and the one or more other mediums provided to the air mixing unit 42 is provided to the cabin 24 to control the temperature of the cabin 24. From the cabin, a portion of the medium therein may be exhausted overboard as cabin discharge air $A_D$ and another portion of the medium therein may be returned to the air mixing unit or to the environmental control system 40 as a third medium or flow of cabin recirculation air $A_R$. As shown, in the existing air management system, the environmental control system 40 and the vapor compression system 30 are independently operable and are not fluidly connected to one another.

Figure 2:
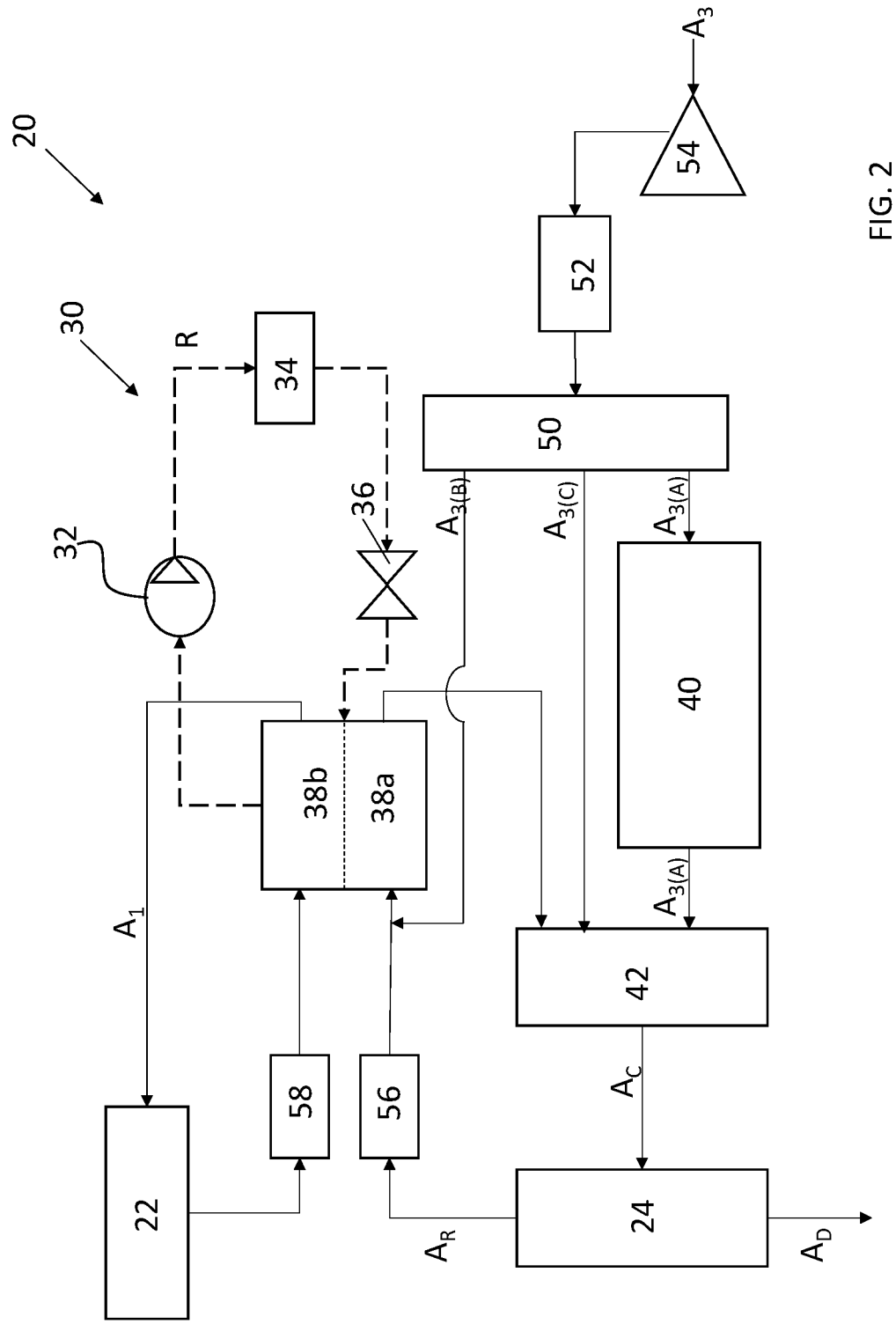
FIG. 2 a schematic diagram of an integrated air management system of an aircraft during normal operation according to an embodiment.

With reference now to FIG. 2, an air management system 20 having an integrated or hybrid vapor compression system 30 and environmental control system 40 according to an embodiment is illustrated. In the illustrated, non-limiting embodiment, the vapor compression system 30 and environmental control system 40 are fluidly coupled to one another. As shown, the air management system 20 includes a mixer or mixing duct 50 located upstream from both the vapor compression system 30 and environmental control system 40. The mixer 50 is configured to receive at least one medium $A_3$ from one or more sources. The medium $A_3$ may be the same medium, or alternatively, a different medium from the medium $A_2$ previously provided to the environmental control system 40.

In an embodiment, the medium $A_3$ provided to the mixer 50 is a flow of bleed air. As used herein, the term "bleed air" includes pressurized air originating from i.e., being "bled" from, an engine or auxiliary power unit of the vehicle. It shall be understood that one or more of the temperature, humidity, and pressure of the bleed air may vary based upon the compressor stage and revolutions per minute of the engine or auxiliary power unit from which the air is drawn. Alternatively, or in addition, the medium $A_3$ provided to the mixer 50 may be a flow of fresh air, such as outside air for example. The outside air can be procured via one or more scooping mechanisms, such as an impact scoop or a flush scoop for example. Regardless of the type of medium provided to the mixer 50, in some embodiments, a heat exchanger 52 is arranged upstream, such as directly upstream for example, from the inlet of the mixer 50. In such embodiments, the flow of medium $A_3$ is conditioned within the heat exchanger 52, prior to being provided to the mixer 50.

Further, in embodiments where the medium $A_3$ includes fresh air, an inlet of the mixer 50 may be fluidly coupled to an outlet of a compressor 54, such as a cabin air compressor operable to pressurize the fresh air for example. One or more components, such as a heat exchanger 52 as previously mentioned, may be arranged between the outlet of the compressor 54 and the inlet of the mixer 50. However, embodiments where the medium $A_3$ output from the outlet of the compressor 54 is provided directly to the inlet of the mixer 50 are also contemplated herein.

The configuration of the vapor compression system 30 is generally identical to that of existing systems. However, in the illustrated, non-limiting embodiment, the second heat exchanger 38 is configured to receive both a flow of first medium $A_1$ output from the first area 22 and a flow of flow to be used to condition the cabin 42, such as the flow of cabin recirculation air $A_R$ output from the second area 24. In the illustrated, non-limiting embodiment, the second heat exchanger 38 includes a fluidly separate first portion 38a and second portion 38b. The refrigeration medium R is arranged in a heat transfer relationship with a medium in both the first portion 38a and the second portion 38b. However, it should be understood that embodiments where the first medium $A_1$ output from the first area 22 and a flow of flow of cabin recirculation air $A_R$ output from the second area 24 are mixed at a location upstream from the heat exchanger 38 are also within the scope of the disclosure. In such embodiments, the flow of the combined first medium $A_1$ and cabin recirculation air $A_R$ output from the second heat exchanger 28 may be divided and returned to the cargo area and the air mixing unit 42 based on the cooling demands of the cargo area 22 and the cabin 24.

As previously noted, the mixer 50 receives one or more flows $A_3$ from an upstream source. During normal operation of the air management system 20, a first flow $A_{3(A)}$ output from the mixer 50 is provided to the environmental control system 40. The amount of the first flow $A_{3(A)}$ provided to the environmental control system may be based on the pressurization demand of the cabin 24. Within the environmental control system 40, the first flow of medium $A_{3(A)}$ is conditioned and/or pressurized to a desired temperature and pressure. The first flow of medium $A_{3(A)}$ output from the environmental control system 40 is provided to the air mixing unit 42, where the first flow of medium $A_{3(A)}$ may be mixed with a flow of medium from another source, such as medium $A_2$ or a flow of recirculation air $A_R$ for example. The conditioned medium Ac formed by mixing the plurality of mediums provided to the air mixing unit 42 is then delivered to a desired second area 24, such as the cabin. As previously described, a portion of the medium within the cabin 24 may be exhausted overboard as cabin discharge air $A_D$ and another portion of the medium from the cabin 24 may be returned to the air mixing unit 42 or to the environmental control system 40 as a flow of cabin recirculation air $A_R$.

In an embodiment, the cabin recirculation air $A_R$ output from the cabin 24 is conditioned within by the vapor compression system 30 before being returned to the air mixing unit 42 or provided to the environmental control system 40. As shown, an outlet of the cabin is fluidly coupled to an inlet of a component of the vapor compression system. In the illustrated, non-limiting embodiment, the flow of cabin recirculation air $A_R$ is conditioned within the first portion 38a of the second heat exchanger prior to being returned to the air mixing unit 42 or the environmental control system 40. A fan 56 may be used to move the flow of cabin recirculation air $A_R$ from the cabin 24 to the second heat exchanger 38. Depending on a direction of flow of the refrigeration medium R within the vapor compression system 30, the refrigeration medium R may be configured to remove heat from, or alternatively, transfer heat to the cabin recirculation air $A_R$ within the first portion of the second heat exchanger.

In an embodiment, a second flow of medium $A_{3(B)}$ output from the mixer 50 is configured to supplement the flow of cabin recirculation air $A_R$ returned to the air mixing unit 42. As shown, the second flow of medium $A_{3(B)}$ may be configured to mix with the cabin recirculation air $A_R$ at a location upstream from the first portion 38a of the second heat exchanger. However, embodiments where the second flow of medium $A_{3(B)}$ is configured to mix with the cabin recirculation air $A_R$ at a location downstream from or at an intermediate location of the first portion 38a of the second heat exchanger are also within the scope of the disclosure. The total amount of the second flow of medium $A_{3(B)}$ mixed with the cabin recirculation air $A_R$ may be selected based on the temperature demand (i.e., the required cooling or heating to be performed) of the cabin 24. Accordingly, during normal operation, the medium output from the environmental control system 40 may be used to primarily meet the pressurization demands of the cabin, and the medium provided to the air mixing unit 42 from the vapor compression system 30 may be used primarily to meet the temperature demands of the cabin. In some embodiments, based on a temperature and pressure demand of the second area 24, a third flow of medium $A_{3(C)}$ is provided directly from the mixer 50 to the air mixing unit 42.

Simultaneously, a flow of a first medium $A_1$ is continuously circulating between the first area 22, such as the cargo compartment for example, and the vapor compression system 30. An outlet of the first area 22 is fluidly coupled to an inlet of a component of the vapor compression system 30, such as the second portion 38b of the second heat exchanger for example. A fan 58 may be used to move the first medium $A_1$ to the second heat exchanger 38. In the illustrated, non-limiting embodiment, the first medium $A_1$ and the cabin recirculation air $A_R$ remain fluidly separate from one another as they make one or more passes through the second heat exchanger 38. Depending on the direction of flow of the refrigeration medium R within the vapor compression system 30, the refrigeration medium R may be configured to remove heat from, or alternatively, transfer heat to the first medium $A_1$ within the second portion of the second heat exchanger 38.

Although the cabin recirculation air $A_R$ and the first medium $A_1$ are illustrated and described herein as being conditioned within the same component of the vapor compression system 30, such as the second heat exchanger 38 for example, it should be appreciated that in other embodiments, the cabin recirculation air $A_R$ may be conditioned in another component of the vapor compression system 30, separate from the first medium $A_1$.

Figure 3:
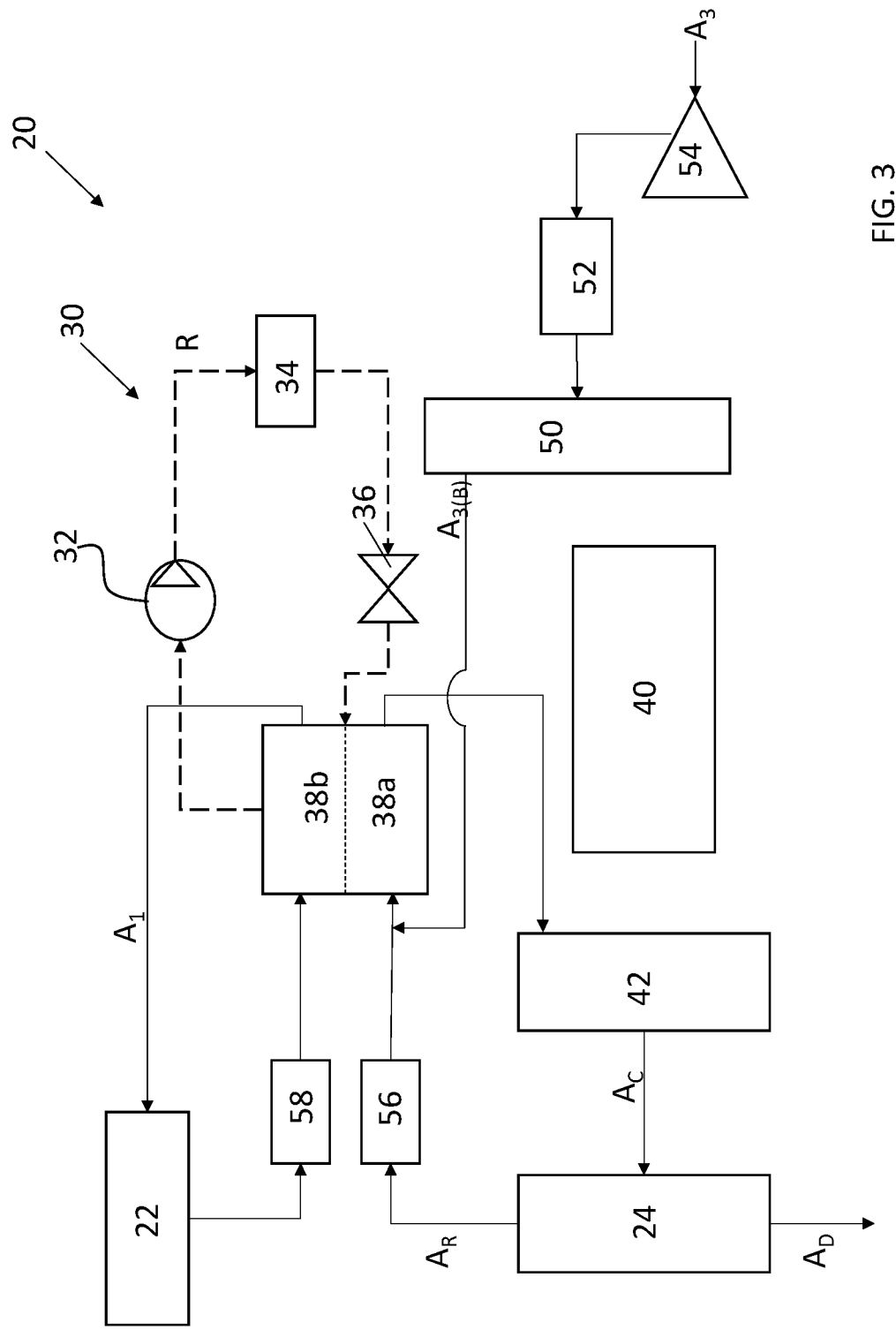
FIG. 3 a schematic diagram of an integrated air management system of an aircraft in the event of a failure of an environmental control system according to an embodiment.

With reference now to FIG. 3, in the event of a failure of the environmental control system 40, the first flow of medium $A_{3(A)}$ will no longer be provided from the mixer 50 to the environmental control system 40. In such embodiments, the primary source of conditioned air provided to the air mixing unit 42 may be the mixture of cabin recirculation air $A_R$ and the second flow of medium $A_{3(B)}$ output from the vapor compression cycle 30. As a result, the volume of the second flow of the medium $A_{3(B)}$ mixed with the cabin recirculation air $A_R$ may increase to meet the demands of the air provided to the cabin 24.

Figure 4:
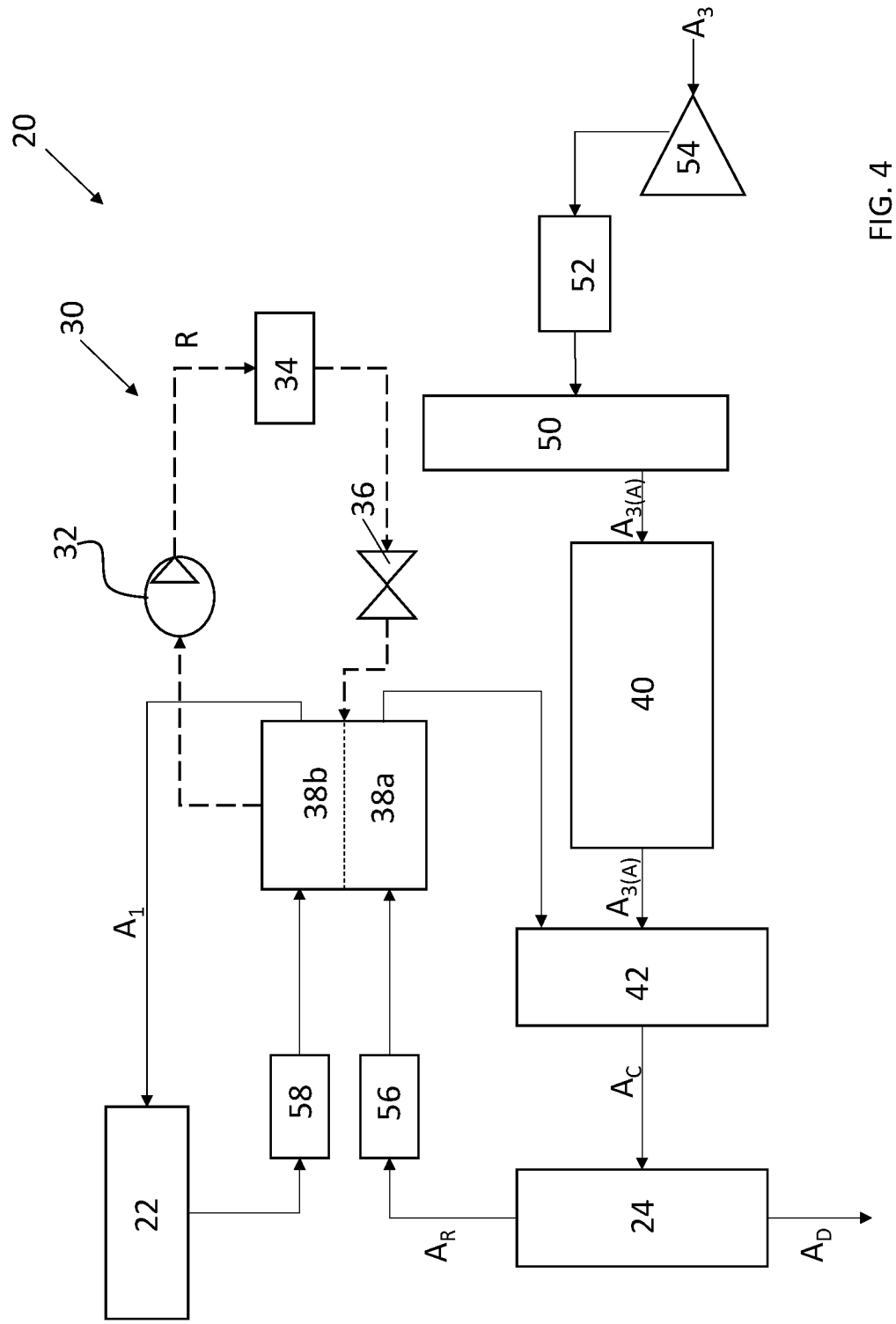
FIG. 4 a schematic diagram of an integrated air management system of an aircraft in the event of a failure of a vapor compression system according to an embodiment.

In the event of a failure of the vapor compression system 30, as shown in FIG. 4, the second flow of medium $A_{3(B)}$ may be eliminated. As a result, only the first flow of medium $A_{3(A)}$ will be output from the mixer 50 and will be provided to the environmental control system 40. In addition, the flow of recirculation air $A_R$ output from the cabin 24 will still be provided to the air mixing unit 42 or the environmental control system 40. However, the flow of recirculation air $A_R$ will not be conditioned as it passes through the vapor compression system 30 and will not be mixed with the second flow of medium $A_{3(B)}$.

Figure 5:
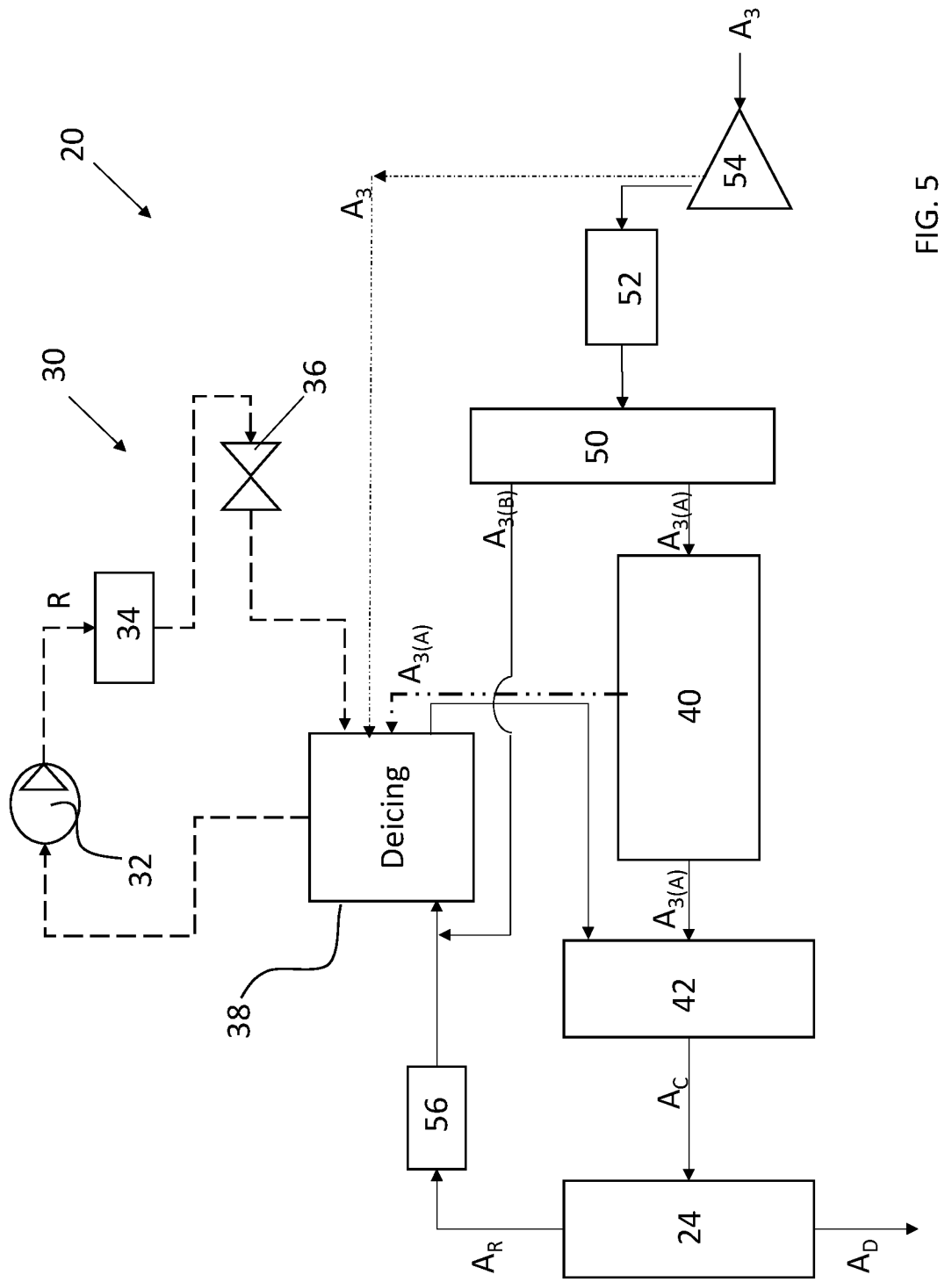
FIG. 5 is a schematic diagram of an integrated air management system of an aircraft according to another embodiment.

With reference now to FIG. 5, during operation of the vapor compression system 30, ice may accumulate at one or more of the heat exchangers of the vapor cycle system. Because the formation of ice can negatively affect the functionality of the heat exchanger, a small amount of a hot medium may be provided from elsewhere in the air management system 20 to perform a deicing operation. Suitable sources for such a hot medium include the first flow of medium $A_{3(A)}$ at an outlet of a compressor of the air cycle machine of the environmental control system 40. Another suitable source for providing a hot medium to deice a heat exchanger, such as heat exchanger 38 for example, is the medium $A_3$ provided at the outlet of the cabin air compressor

54. It should be understood that although these flows are illustrated and described herein as being used to deice a heat exchanger of the vapor compression cycle, in other embodiments, these flows could be used to perform a deicing operation at other component or systems of the aircraft.

An air management system 20 integrating or fluidly coupling a vapor compression system 30 and an environmental control system 40 may reduce the overall complexity and weight of the air management system 20. In addition, such a configuration separates the cooling and pressurization demands of the cabin, thereby relying on different sources to meet each demand.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle comprising: a first area conditioned by a first medium; a second area conditioned by a second medium; and an air management system including: a source of third medium, the third medium being separable into a plurality of parallel flows including a first flow of the third medium and a second flow of the third medium; an environmental control system fluidly coupled to the source of third medium and to the second area, wherein an inlet of the environmental control system is arranged downstream from and is configured to receive the first flow of the third medium, and a closed loop vapor compression system having a refrigeration medium circulating therein, the vapor compression system being fluidly coupled to the first area, the second area, and the source of third medium; a mixing unit fluidly connected to an inlet of the second area; wherein during normal operation, both the first flow of the third medium conditioned within the environmental control system and the second flow of the third medium are provided to the second area, and the second flow of the third medium is mixed with the second medium at a location upstream from the mixing unit.

2. The vehicle of claim 1, wherein the second flow of the third medium is conditioned within the vapor compression system.

3. The vehicle of claim 2, wherein the second flow of the third medium is mixed with a flow of cabin recirculation air at a location upstream from the second area.

4. The vehicle of claim 3, wherein the second flow of the third medium is mixed with the flow of cabin recirculation air at a location upstream from the vapor compression system.

5. The vehicle of claim 4, wherein the vapor compression system further comprises a heat exchanger and the mixed second flow of the third medium and the flow of cabin recirculation air is conditioned within the heat exchanger.

6. The vehicle of claim 2, wherein the second flow of the third medium is mixed with a flow of cabin recirculation air at a location downstream from the vapor compression system.

7. The vehicle of claim 3, wherein a temperature of the second flow of the third medium mixed with the flow of cabin recirculation air is selected to meet a temperature demand of the second area.

8. The vehicle of claim 1, wherein a pressurization of the first flow of the third medium is selected to meet a pressurization demand of the second area.

9. The vehicle of claim 1, further comprising a mixer located upstream from the environmental control system and the vapor compression system, wherein a flow of third medium output from the mixer is provided to the inlet of the environmental control system as the first flow of third medium and another flow of third medium output from the mixer is provided to vapor compression cycle as the second flow of third medium.

10. The vehicle of claim 9, further comprising a heat exchanger arranged upstream from an inlet the mixer.

11. The vehicle of claim 9, further comprising a compressor arranged upstream from an inlet of the mixer.

12. The vehicle of claim 1, wherein at least one of the first area is a cargo area and the second area is a cabin.

13. The vehicle of claim 1, wherein the vapor compression system further comprises a heat exchanger fluidly coupled to an outlet of the first area, the first medium at an outlet of the first area is conditioned within the heat exchanger.

14. The vehicle of claim 12, wherein a heat exchanger has a first portion and a second portion fluidly separate from the first portion, wherein an inlet of the first portion is fluidly coupled to the second area an inlet of the second portion is fluidly coupled to the first area.

15. An air management system comprising:
an area to be conditioned by at least one of a first medium and a second medium;
a first system fluidly coupled to the area to be conditioned; and
a second system fluidly coupled to the area to be conditioned;
wherein a first portion of the first medium is provided to the area to be conditioned from the first system and a mixture of the second medium and a second portion of the first medium separate from the first portion of the first medium, is provided to the area to be conditioned from the second system, wherein a pressurization of the first portion of the first medium is selected to meet a pressurization demand of the area and a temperature of the mixture of the second medium and the second portion of the first medium is selected to meet a temperature demand of the area to be conditioned.

16. The air management system of claim 15, wherein the second system, includes a heat exchanger and the second medium is conditioned within the heat exchanger.

17. The air management system of claim 16, wherein the second system is a closed loop vapor compression system.

18. The air management system of claim 15, wherein the first system is an environmental control system.

19. The air management system of claim 15, wherein the second medium is cabin recirculation air.

20. A vehicle comprising:
a first area conditioned by a first medium;
a second area conditioned by a second medium; and
an air management system including:
   a source of third medium;
   an environmental control system fluidly coupled to the source of third medium and to the second area, and
   a closed loop vapor compression system having a refrigeration medium circulating therein, the vapor compression system being fluidly coupled to the first area, the second area, and the source of third medium, the vapor compression system having a heat exchanger fluidly connected to and arranged downstream from an outlet of the first area and an outlet of the second area, wherein the first medium output from the first area and a fourth medium output from the outlet of the second area are simultaneously conditioned within the vapor compression system;
wherein during normal operation, both a first flow of the third medium conditioned within the environmental control system and a second flow of the third medium are provided to the second area.

\* \* \* \* \*